(12) United States Patent
Aritomi

(10) Patent No.: US 8,560,738 B2
(45) Date of Patent: Oct. 15, 2013

(54) INFORMATION PROCESSING DEVICE THAT ACCESSES A DEVICE MANAGEMENT PROGRAM AND MANAGES THE PERIPHERAL DEVICE AND MANAGES SETTING INFORMATION FOR THE PERIPHERAL DEVICE

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/906,616

(22) Filed: Oct. 18, 2010

(65) Prior Publication Data

US 2011/0093621 A1 Apr. 21, 2011

(30) Foreign Application Priority Data

Oct. 20, 2009 (WO) .................. PCT/JP2009/068080

(51) Int. Cl.
*G06F 3/00* (2006.01)
(52) U.S. Cl.
USPC ............................................................ 710/8
(58) Field of Classification Search
None
See application file for complete search history.

(56) References Cited

U.S. PATENT DOCUMENTS

| 7,788,355 | B2 * | 8/2010 | Maeda .......................... 709/223 |
| 8,155,019 | B2 * | 4/2012 | Abe ................................ 370/252 |
| 2003/0103226 | A1 | 6/2003 | Nishio | |
| 2004/0073609 | A1 | 4/2004 | Maekawa et al. | |
| 2005/0024671 | A1 * | 2/2005 | Abe ............................ 358/1.13 |
| 2007/0058634 | A1 * | 3/2007 | Gupta et al. ................... 370/392 |
| 2008/0222213 | A1 | 9/2008 | Arai | |
| 2009/0222514 | A1 | 9/2009 | Igarashi | |

FOREIGN PATENT DOCUMENTS

| JP | 2003-167696 A | 6/2003 |
| JP | 2004-038526 A | 2/2004 |
| JP | 2007-272868 A | 10/2007 |
| JP | 2008-217685 A | 9/2008 |
| JP | 2008-287671 A | 11/2008 |

* cited by examiner

*Primary Examiner* — Idriss N Alrobaye
*Assistant Examiner* — Richard B Franklin
(74) *Attorney, Agent, or Firm* — Canon USA Inc. IP Division

(57) ABSTRACT

There is disclosed an information processing device that displays a link related to one peripheral device on a device screen. The information processing device includes obtaining means for obtaining device information of a peripheral device, link forming means for forming the link corresponding to setting information obtained by the obtaining means, and access means for accessing a device management program that manages the peripheral device corresponding to the link when it is determined that an instruction of the link formed by the link forming means has been provided on the device screen.

13 Claims, 16 Drawing Sheets

↔ REPRESENTS ADDRESS/DATA BUS

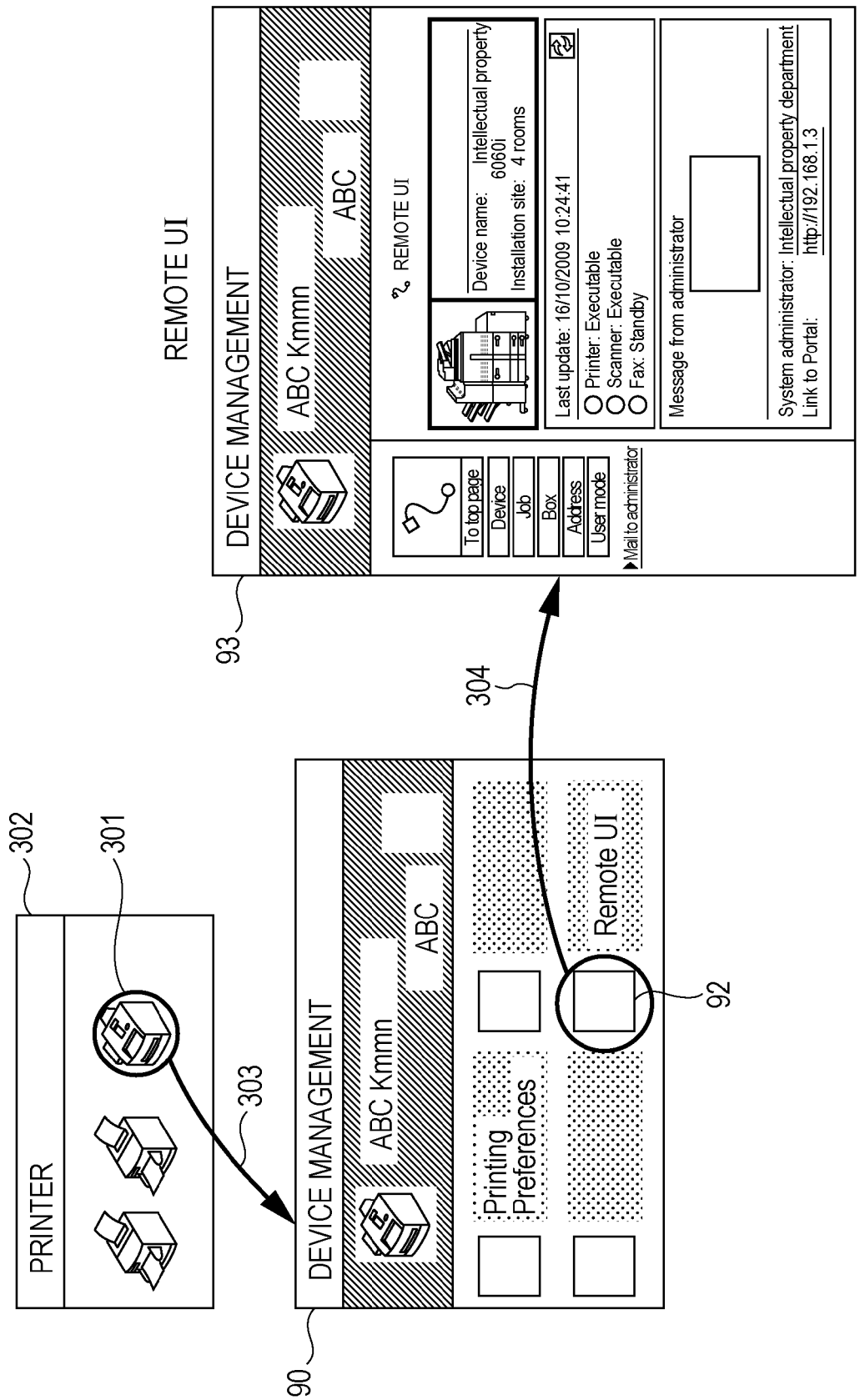

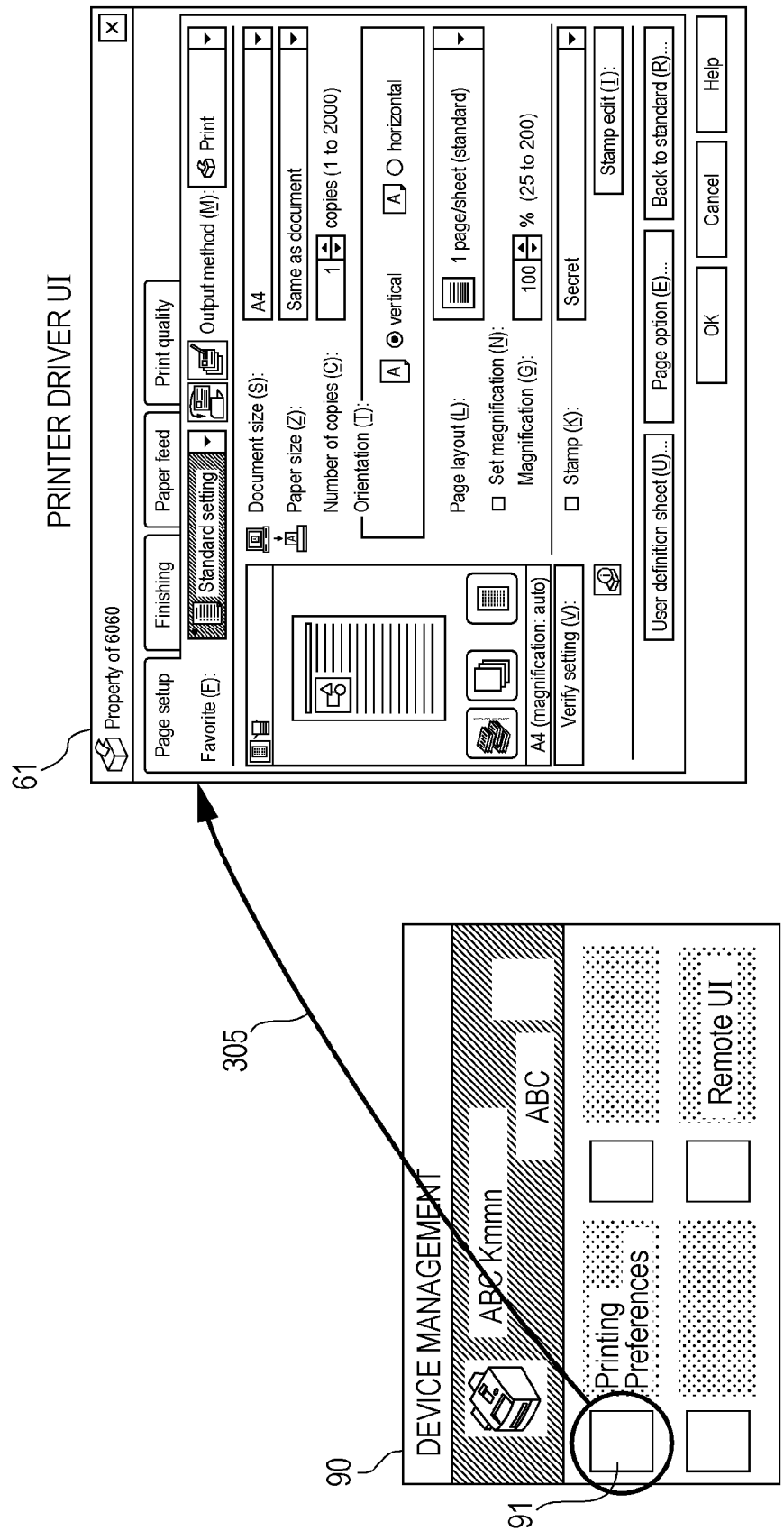

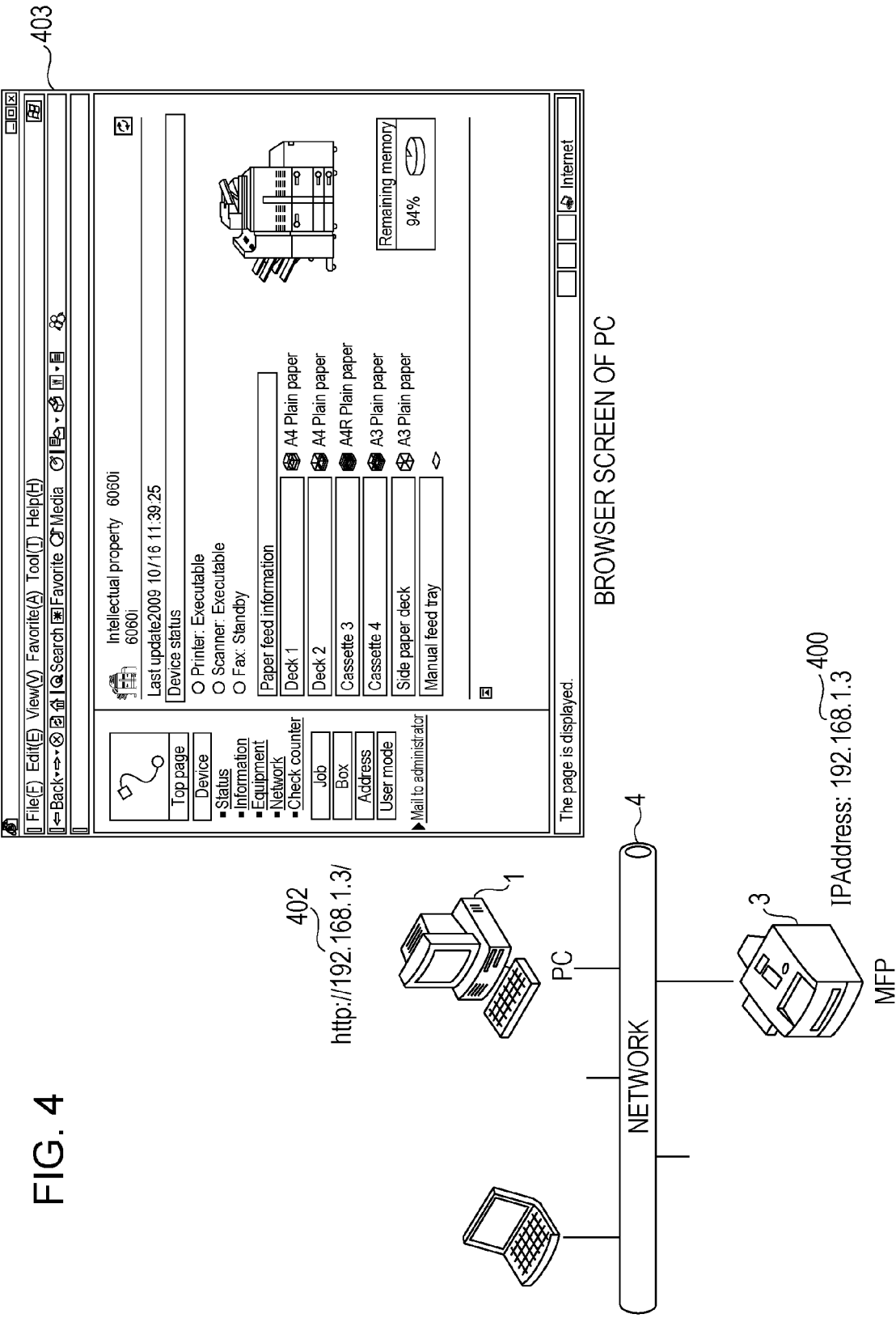

FIG. 8A

DEVICE MANAGEMENT CONTROL FILE    800

```
<?xml version="1.0" encoding="utf-8"?>
  <dm:deviceManagement xmlns:dm="http://abc.xxx/dm/control">
    <dm:manufacturer>ABC</dm:manufacturer>   ──801
    <dm:model>Kmmn</dm:model>   ──802
...
    <dm:function>
      <dm:name xml:lang="en-US">Printing Preferences</dm:name>   ──807
      <dm:execute>printingPreferences</dm:execute>   ──808
    </dm:function>
...
    <dm:function>
      <dm:name xml:lang="en-US">Remote UI</dm:name>   ──809
      <dm:execute>$RemoteUI</dm:execute>   ──810
    </dm:function>
...
```

FIG. 8B

TYPES OF CONNECTION PORTS    820

| TCP/IP | WSD | |
| USB | PARALLEL | COMPORT |
| FILE | ... | DEFAULT |

FIG. 8C

DESTINATION http://{IP address}:{port number}/ ──850        851 http://192.168.1.3:80/

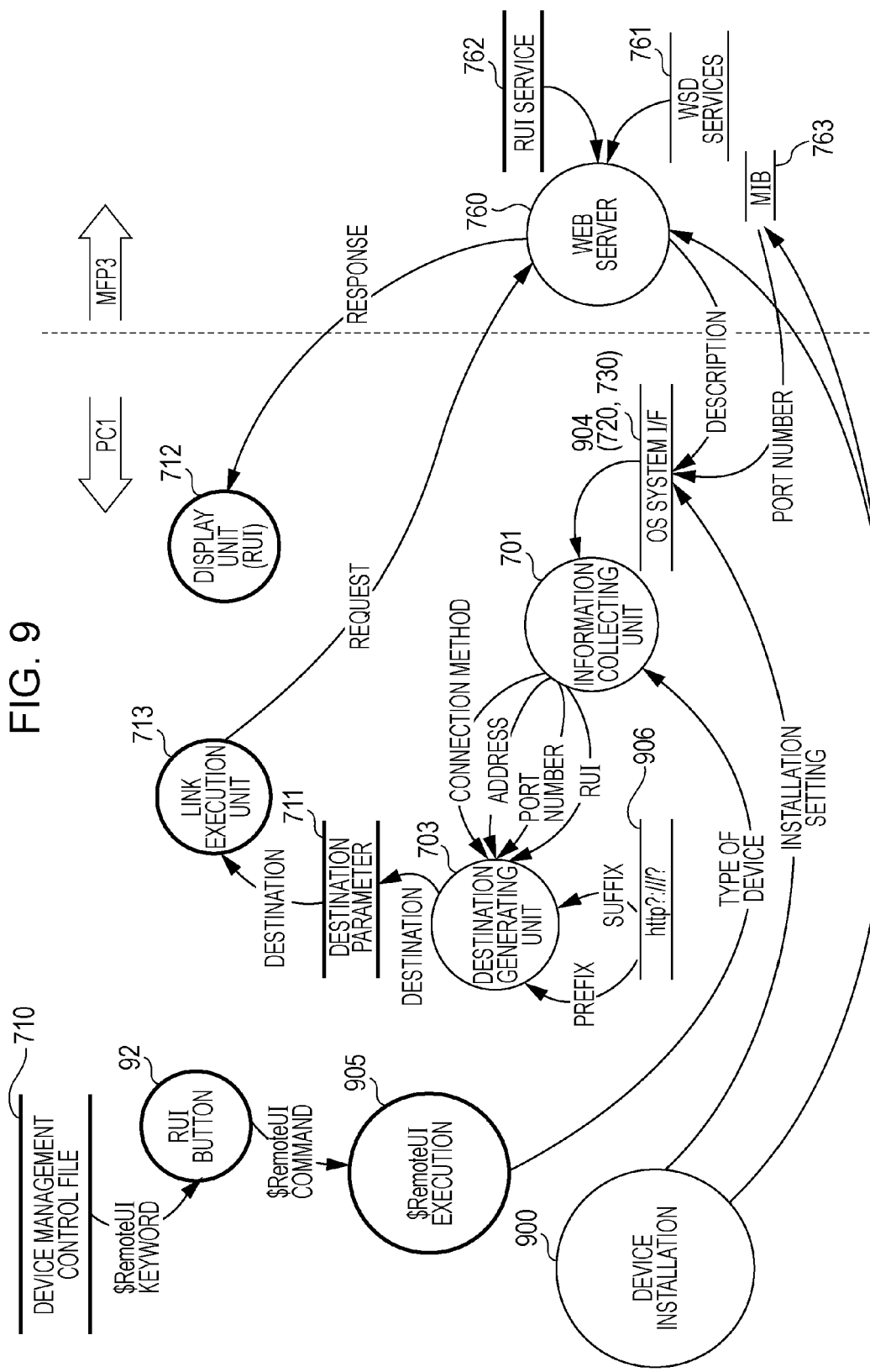

INFORMATION PROCESSING DEVICE THAT ACCESSES A DEVICE MANAGEMENT PROGRAM AND MANAGES THE PERIPHERAL DEVICE AND MANAGES SETTING INFORMATION FOR THE PERIPHERAL DEVICE

BACKGROUND OF THE INVENTION

1. Technical Field

The present invention relates to an information processing device that communicates with a peripheral device, an information processing method, and a program.

2. Background Art

In recent years, a peripheral device control system has been effectively used in various forms in homes and offices. In this system, peripheral devices are connected to a personal computer (hereinafter abbreviated as PC) using various types of interfaces, such as a universal serial bus (USB), Ethernet, and a wireless local area network (LAN). Examples of the peripheral devices include a printer, a copy machine, a facsimile, a scanner, a digital camera, and a multifunction device combining these functions.

In Windows (registered trademark) 7, a new function of managing peripheral devices connected to a PC is introduced. The new function is called Devices and Printers, which is a window for displaying devices connected to a PC, and Device Stage (registered trademark), which has a function of linking to a service related to each device. In Device Stage, a visual screen can be provided, which enables a user to easily access a function or service related to a device.

Technologies called Universal Plug and Play (UPnP) and Web Services on Devices (WSD) are available. These are mechanisms for recognizing a connection between a PC and a peripheral device in a network and a change thereof, and are technologies for returning a service or address from a peripheral device to a PC through a search from the PC (PTL 1).

Also, a software technology that enables verification of a situation, an operation, and various settings of an MFP device through a network from a Web browser or the like is available. When a Web browser is started and a uniform resource identifier (URI) corresponding to an MFP device is specified in a PC, a screen provided by a Web server included in the MFP is displayed on the Web browser. This is a device remote management technology that enables a user to perform various settings and control of the MFP device by operating the screen on the Web browser.

In Japanese Patent Laid-Open No. 2003-167696, there has been a problem that it is difficult for a user to operate software for use in the device remote management technology.

There has been another problem that it is difficult for a user to input a network address or the like to software for use in the device remote management technology.

SUMMARY OF INVENTION

The present invention has been made in view of at least one of the above-described problems.

Further features of the present invention will become apparent from the following description of exemplary embodiments with reference to the attached drawings.

BRIEF DESCRIPTION OF DRAWINGS

FIG. 3A is a diagram illustrating an example of a basic operation of this device management system.

FIG. 3B is a diagram illustrating an example of a basic operation of this device management system.

FIG. 4 is a diagram illustrating an example of operation of a remote UI function.

FIG. 8A is a diagram illustrating an example of a data format of this system.

FIG. 8B is a diagram illustrating an example of the types of connection ports.

FIG. 8C is a diagram illustrating an example of a destination.

FIG. 9 is a diagram illustrating an example of a data flow according to this embodiment.

DESCRIPTION OF EMBODIMENTS

Hereinafter, an embodiment of the present invention will be described with reference to the drawings. An item "Devices and Printers" is provided in "control panel" that holds management items of an operating system (OS) function. Clicking "Devices and Printers" causes a window to be opened. On the window of "Devices and Printers", external devices connected to a PC can be collectively managed. On the window of "Devices and Printers", an icon with an appearance of a real device may be placed based on metadata.

First, a technology serving as a precondition of this embodiment will be described. When an icon of a device displayed on the window of "Devices and Printers" is double-clicked, "Device Stage" for accessing detailed information is displayed. The content displayed in Device Stage is designed by a manufacturer. In Device Stage, operations related to a selected device can be collectively performed, for example, linking to various setting menus of a device or the like, update information, and a manual of the device.

First, an instruction to display a screen of Devices and Printers (the foregoing Devices and Printers) (302 in FIG. 3A) can be provided from "start menu" of MS Windows (the name of product), for example. Furthermore, a Device Stage screen (90 in FIG. 3A) of each device can be opened from the Devices and Printers screen. In the Device Stage, a visual screen can be provided, which enables a user to easily access a function or service related to the device. For example, in a printer, a link to an application for opening a photo or document and displaying or printing it can be provided on the Device Stage screen. Also, with the widespread use of the Internet, various online services using the Internet have been provided, in which an information processing device and a peripheral device are connected to the Internet. For example, a link to a support site provided by a manufacturer on the Internet is provided on the Device Stage screen, so that a user can access the site.

Hereinafter, the embodiment of the present invention will be described in detail. In the description given below, an example will be described on the basis of a system that includes a computer and a printer.

[Block Diagram Illustrating Configuration of System]

Figure 1:
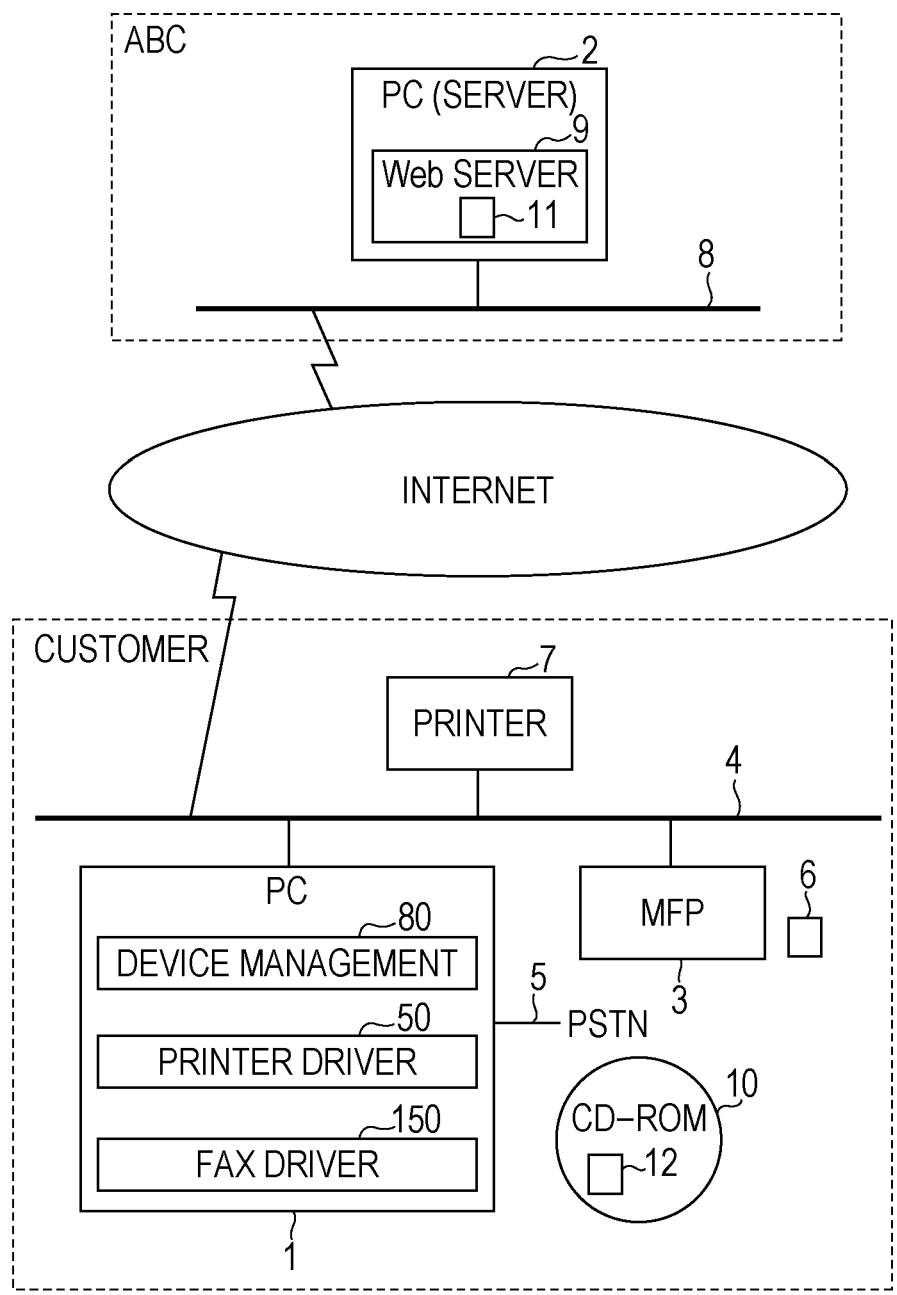
FIG. 1 is a block diagram illustrating an example of a configuration of a system according to an embodiment of the present invention.

FIG. 1 is a block diagram illustrating a configuration of a system according to the embodiment of the present invention.

In FIG. 1, reference numerals 1 and 2 denote information processing devices, which are constituted by typical PCs. The PC 1 and the PC 2 are constituted by hardware described below with reference to FIG. 2A and are installed with an OS equivalent to Windows 7 by Microsoft Corporation in the United States. The PC 1 and the PC 2 are connected to networks 4 and 8 constituted by Ethernet (registered trademark), respectively. Reference numeral 3 denotes a multifunction printer (hereinafter abbreviated as MFP), which is constituted by a color inkjet printer, a color facsimile, a color scanner, and the like, and serves as an example of a peripheral device in the present invention. The MFP 3 is an MFP having a model name "Kmmn" manufactured by ABC company. Examples of peripheral devices in this embodiment include a printer, a copy machine, a facsimile, a scanner, a digital camera, and a device having those multiple functions. The MFP 3 is constituted by hardware described below with reference to FIG. 2B, is connected to the PC 1 through the network 4, and can perform two-way communication therewith. Reference numeral 80 denotes an application and is constituted by a file in an executable form (*.EXE) for Windows (the name of product). As an example of the present invention, the application 80 has a function of displaying a device management screen 90 illustrated in FIG. 3A. Reference numeral 50 denotes a printer driver. Reference numeral 150 denotes a FAX driver. The network 4 is a home network for use in a standard home that is constructed in a house where the user (customer) of the MFP 3 lives. The MFP 3 is an MFP that is connected to the PC 1 through the network 4 in the house and is shared by members of a family. The network 8 is an office network constructed in ABC company. The PC 2 connected to the network 8 includes a Web server 9 having a Web server function and provides a Web site of ABC company through the Internet. Reference numeral 10 is a compact disc read only memory (CD-ROM) that can be inserted into the PC 1 and stores software and electronic files. Reference numerals 11 and 12 denote device management control files described below with reference to FIG. 8A, which are distributed from the Web server 9 or the CD-ROM 10. Reference numeral 5 denotes an analog telephone line, which is used for transmission or reception of facsimile in the PC 1. Reference numeral 6 denotes a flash memory, which can be referred to as a storage from the PC 1 when being attached to a slot (omitted in the figure) for the flash memory of the MFP 3. Reference numeral 7 denotes a printer, having a model "Defg" manufactured by XYZ company. The printer 7 is a device completely different from the MFP 3.

[Block Diagram Illustrating Hardware Configuration]

Figure 2A:
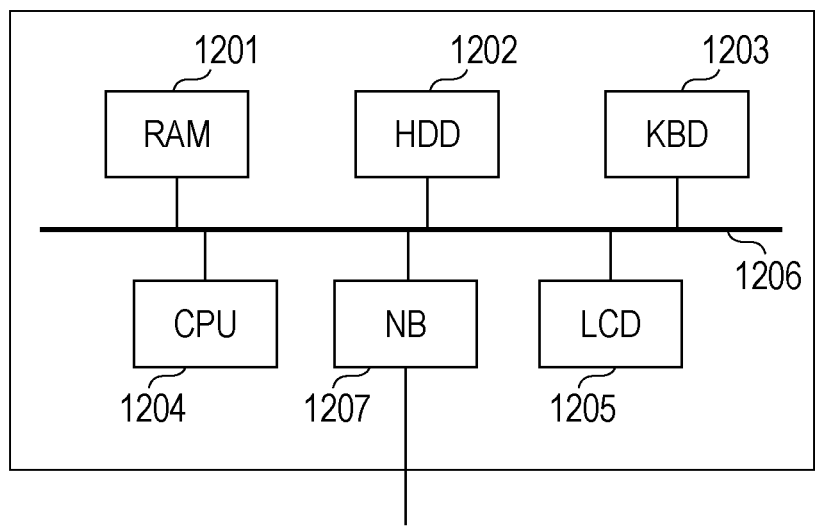
FIG. 2A is a block diagram illustrating an example of a hardware configuration of a PC.
Figure 2B:
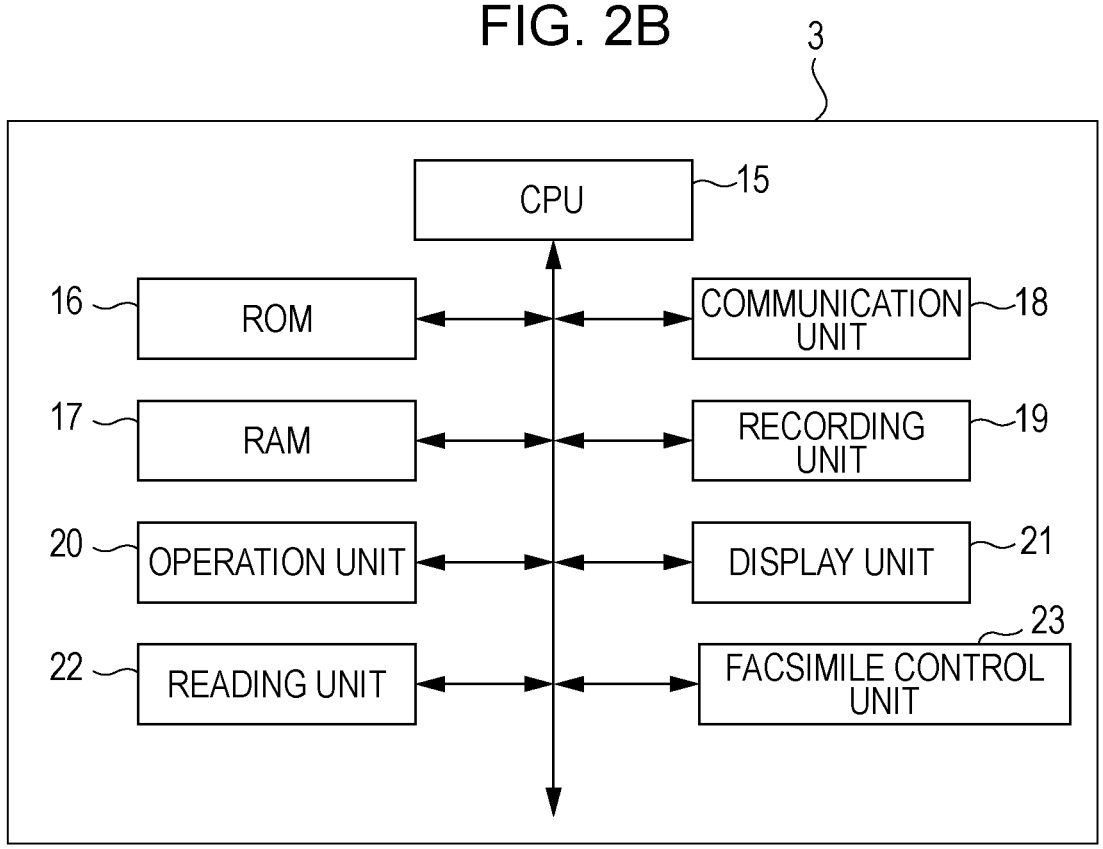
FIG. 2B is a block diagram illustrating an example of a hardware configuration of a printer.

FIGS. 2A and 2B are block diagrams illustrating an example of hardware configurations of a PC and a printer.

FIG. 2A is a block diagram illustrating an example of a hardware configuration of a PC. The PC 1 and the PC 2 are constituted by the hardware illustrated in the FIG. 2A. A description will be given while regarding the PC in FIG. 2A as the PC 1.

Figure 7:
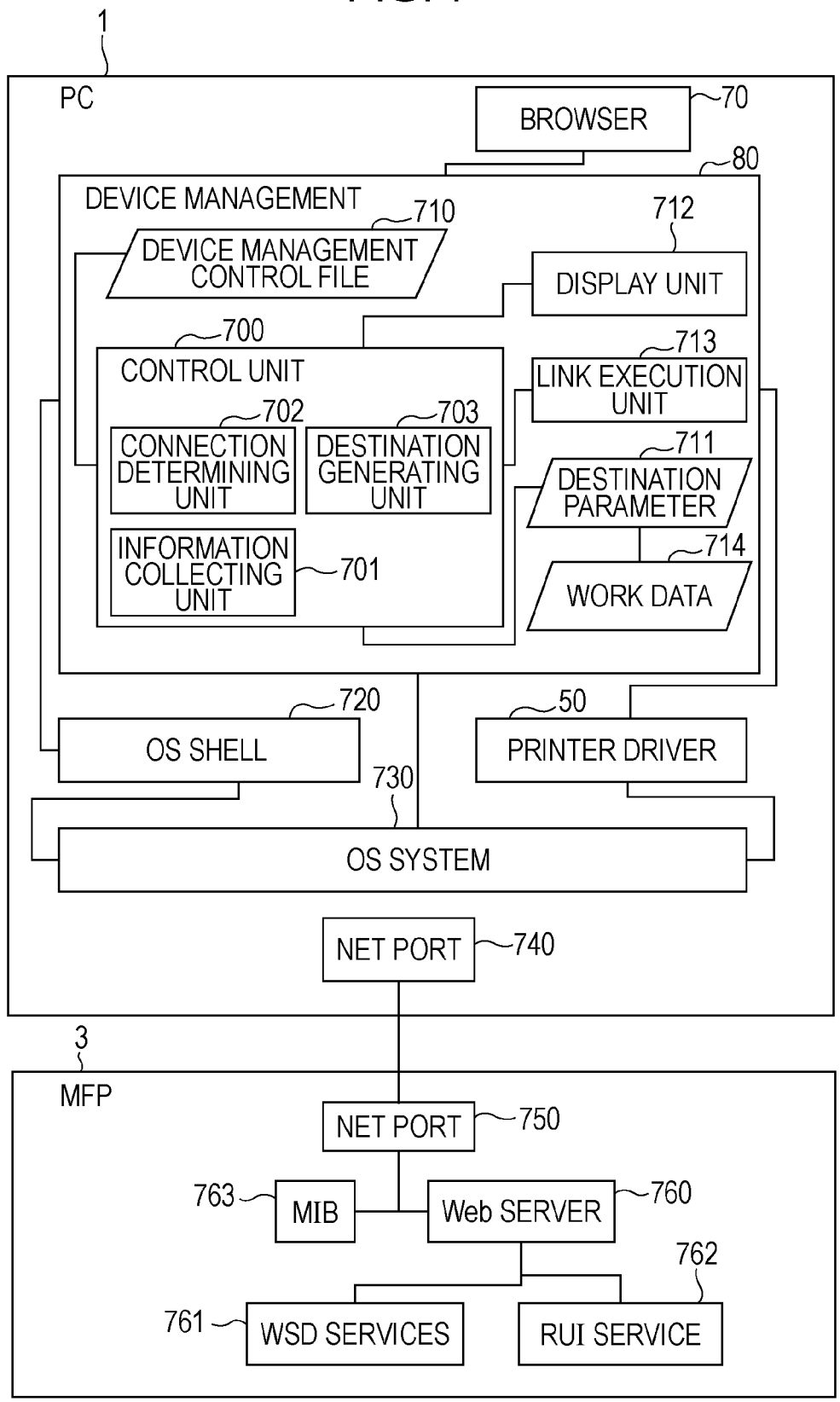
FIG. 7 is a block diagram illustrating an example of a software configuration of this system.

As illustrated in FIG. 2A, the PC 1 includes a random access memory unit (RAM 1201), a hard disk drive unit (HDD 1202) serving as a storage unit, a keyboard unit (KBD 1203) serving as an example of an input unit, and a central processing unit 1204 serving as a control unit. Furthermore, the PC 1 includes a display (LCD 1205) serving as an example of a display unit, a network board (NB 1207) serving as an example of a communication control unit, and a bus 1206 that mutually connects the foregoing elements of the PC 1. The storage unit may be a portable CD-ROM or a build-in ROM. An application, such as the device management 80, and individual modules (software) illustrated in FIG. 7 are stored in the HDD 1202, are read to the RAM 1201 as necessary, and are executed by the CPU 1204. Accordingly, the CPU 1204 realizes the application, such as the device management 80, and the functions of the individual modules (software) illustrated in FIG. 7.

FIG. 2B is a block diagram illustrating a hardware configuration of an MFP. The MFP 3 has the hardware configuration illustrated in FIG. 2B. In FIG. 2B, reference numeral 15 denotes a CPU constituted by a microprocessor or the like. The CPU serves as a central processing unit of the MFP 3 and controls a RAM 17, a communication unit 18, a recording unit 19, an operation unit 20, a display unit 21, a reading unit 22, and a facsimile control unit 23 in accordance with a program stored in a ROM 16. The ROM 16 stores a program with which the MFP 3 performs a recording (printing) process and a process of informing the PC 1 of a status in accordance with control performed by the printer driver 50. The RAM 17 temporarily stores print data that is transmitted mainly from the PC 1. The recording unit 19 performs printing on the basis of the print data. Also, the RAM 17 temporarily stores image data read by the reading unit 22, transmission data of facsimile transmitted from the PC 1, reception data of facsimile received by the facsimile control unit, and the like. The communication unit 18 includes a connection port for the network 4 and a connection port for the analog telephone line 5, and controls Ethernet and analog communication of facsimile. The recording unit 19 includes a recording unit constituted by a recording head based on an inkjet method, ink of individual colors, a carriage, a recording paper carrying mechanism, etc., and an electric circuit constituted by an application specific integrated circuit (ASIC) for generating printing pulses on the basis of the foregoing print data in the recording head. With a printing operation in an application capable of performing printing or a facsimile transmission operation, displayed content (image data) of a file opened in an application is temporarily stored as a spool file in an enhanced metafile (EMF) format in the HDD 1202 of the PC 1. Then, the image data is converted into print data or facsimile transmission data including a control command of the MFP 3 via the printer driver 50 or the FAX driver 150, and is then transmitted to the MFP 3 through the network 4. The print data received by the MFP 3 is converted into printing pulses and is printed on printing paper by the recording unit 19. The facsimile transmission data received by the MFP 3 is converted into a facsimile communication protocol by the facsimile control unit 23 and is transmitted to a facsimile device on the other end through the analog telephone line 5. Reference numeral 20 denotes an operation unit, which is constituted by various buttons including a power button and a reset button and which is capable of operating the MFP 3. Reference numeral 21 denotes a display unit, which is constituted by a liquid crystal display of a touch panel and which is capable of displaying a status of the MFP 3 and displaying and inputting various settings and telephone numbers. Reference numeral 22 denotes a reading unit, which is constituted by a color image sensor and an electric circuit constituted by an ASIC or the like for image processing. Reference numeral 23 denotes a facsimile control unit, which is constituted by a modem for facsimile and an analog communication circuit and which controls transmission and reception of facsimile in accordance with a facsimile communication protocol.

[Overview of Device Management Function]

FIG. 4 is a schematic view of a remote user interface (UI) function, which is a device management function based on the Web. The remote UI is software that enables verification of a situation, an operation, and various settings through accessing the MFP 3 via a network from a Web browser. A Web server for using the remote UI is included in the MFP 3. The Web server transmits a requested page, and the page is displayed on the Web browser. The remote UI can be used when the MFP 3 on the network 4 is connected to the PC 1. In this embodiment, the remote UI may be abbreviated as RUI.

An IP address is set to establish a network connection by using a control panel (not illustrated) of the MFP 3. Here, as denoted by reference numeral 400, an IP address 192.168.1.3 is set to the MFP 3. A Web browser is started in the PC 1 and the IP address of the MFP 3 is specified, then a screen 403 of the remote UI is displayed, and the remote UI can be used. A user starts the Web browser and specifies http://192.168.1.3/ as denoted by reference numeral 402 in an address bar on the browser screen of the PC 1 displayed on the remote UI screen 403, and then the remote UI is displayed as in the Web browser screen of the PC 1.

Example of Basic Operation of this System

FIGS. 3A and 3B are diagrams illustrating an example of operation of the device management 80. FIG. 3A illustrates an example of operation of executing the remote UI using the device management 80. In FIG. 3A, reference numeral 302 denotes the foregoing Devices and Printers folder, which is displayed on the PC 1. A printer and FAX available in the PC 1 are displayed therein for each driver. The device named ABC Kmmn is also displayed as a printer icon 301. When the printer icon 301 is clicked (303), the device management screen 90 opens. A remote UI button 92 is provided on the device management screen 90. When the remote UI button 92 is clicked (304), the device management screen 90 is switched to a remote UI screen 93. A remote UI of the device is displayed on the remote UI screen 93. The remote UI screen 93, which is an example of a remote UI screen, may have the configuration of the remote UI screen 403 illustrated in FIG. 4.

A remaining amount of paper and various statuses are obtained via a controller of the MFP to form a Hypertext Markup Language (HTML) page, which is transmitted to the PC 1. When the HTML page is received by the PC 1, the HTML page can be displayed using the Web browser. The display information of the RUI can be constituted by using Java (registered trademark) and other programs, in addition to the HTML.

FIG. 3B illustrates an example of operation of executing a printer driver UI using the device management 80. A print setting button 91 is provided on the device management screen 90. When the print setting button 91 is clicked (305), a printer driver UI 61 opens. An example of the operation according to this embodiment has been described above.

Next, an example of operation of display/non-display of a RUI button according to this embodiment will be described. A description will be given of an example in which display/non-display of the RUI button on the device management screen 90 is switched in accordance with a connection form between the PC 1 and the MFP 3.

Example of Display/Non-Display of RUI Button

Figure 5A:
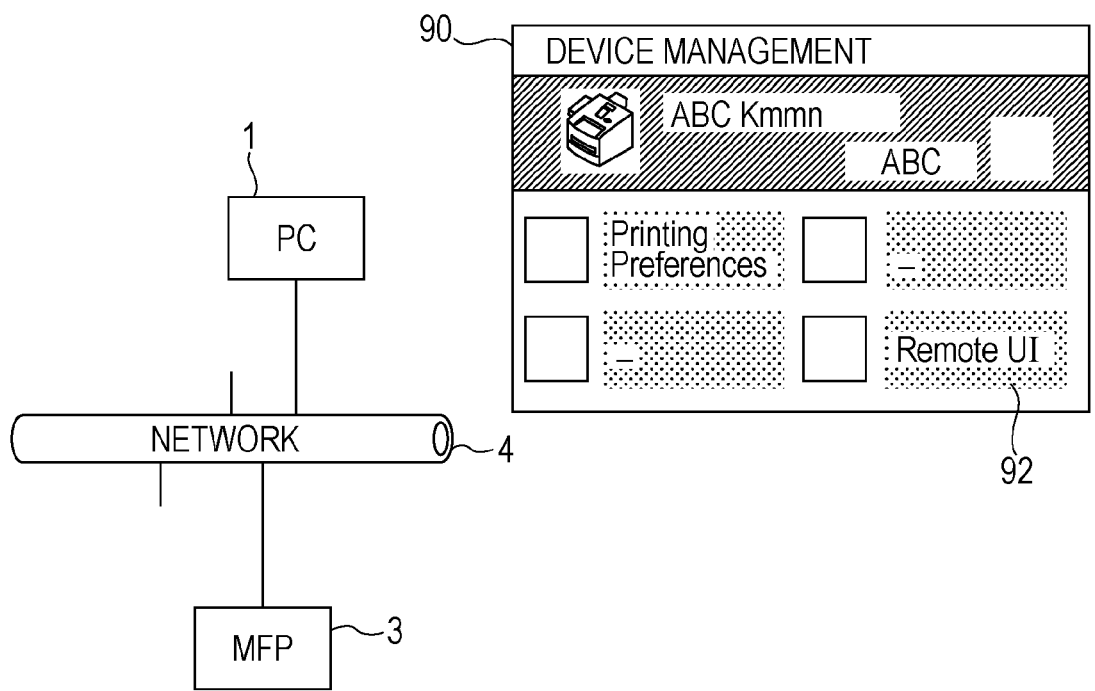
FIG. 5A is a diagram illustrating an operation example of display of a RUI button of this system.

An example of operation of display/non-display of the RUI button in this system will be described with reference to FIGS. 5A and 5B.

A description has been given above that the remote UI is software for accessing the MFP 3 through the network from the Web browser, with reference to FIG. 4. FIG. 5A illustrates an example in which the RUI button is displayed. The PC 1 is connected to the MFP 3 through the network 4. Since the network 4 is used, the remote UI is available. In this case, the remote UI button 92 is displayed on the device management screen 90.

Figure 5B:
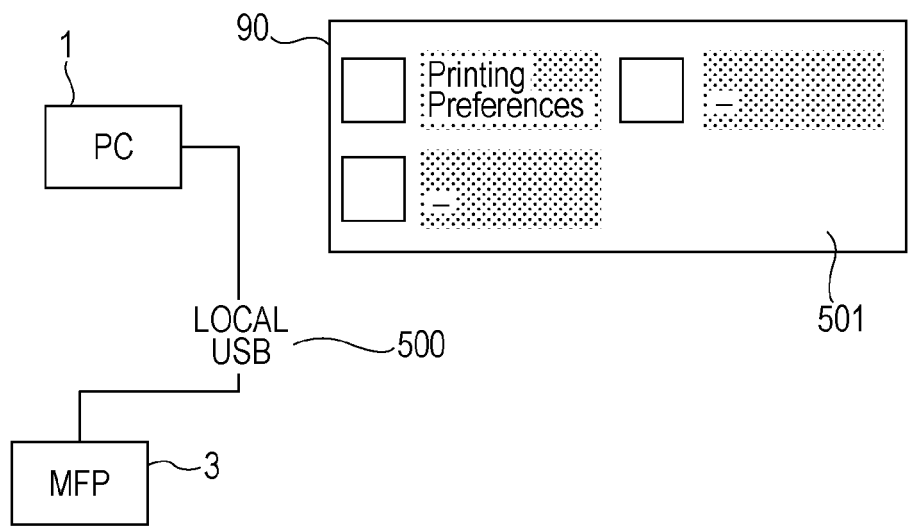
FIG. 5B is a diagram illustrating an operation example of non-display of a RUI button of this system.

FIG. 5B illustrates an example in which the remote UI button is not displayed. A description will be given by extracting part of 90 in FIG. 5A. The PC 1 is connected to the MFP 3 through a local USB 500. Since the local USB 500 is used instead of the network 4, the remote UI is unavailable. In this case, the remote UI button is not displayed on the device management screen 90 (501). The form of non-display is not limited to not displaying at all, and various display forms are acceptable, such as gray-out.

An example of operation of display/non-display of the RUI button in this system has been described above. Next, a description will be given of an example of switching of a client area when the RUI is displayed in the device management 80. This corresponds to a process of seamlessly switching the client area by the device management 80 when the RUI is displayed.

Example of Switching Client Area when Remote UI is Displayed

Figure 6:
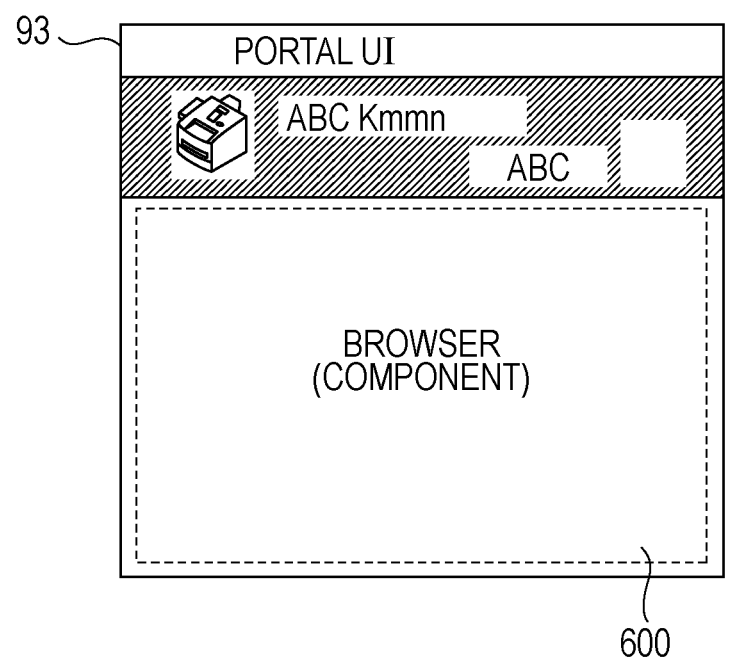
FIG. 6 is a diagram illustrating an example of switching a client area when a RUI is displayed in this device management.

With reference to FIG. 6, a description will be given of an example of switching the client area by the device management 80 when the remote UI of is displayed.

A description has been given above that the remote UI is displayed as in the screen 403 of the Web browser of the PC 1 illustrated in FIG. 4 when the RUI is called. The screen may be switched to the UI screen 93 instead of the remote UI screen 403.

Also, a description has been given above with reference to FIG. 3A that the device management screen 90 is switched to the remote UI screen 93 when the remote UI button 92 is clicked (304). When receiving an instruction to display the remote UI screen 93, the device management 80 switches the client area to a Web browser component 600. In some cases, the device management 80 displays the remote UI by using the switched Web browser component.

A description has been given above of an example of switching the client area by the device management 80 when the RUI is displayed. A description has been given above of the overview of operation of this system. Hereinafter, the software of this system will be described. Then, a block diagram illustrating an example of the software configuration of this system will be described.

[Block Diagram of Software Configuration]

FIG. 7 is a block diagram illustrating an example of the software configuration of this system.

The device management 80 exists as a file that is stored in the HDD 1202. This is a program module that is loaded to the RAM 1201 by an OS or a module that uses the module thereof and that is interpreted and executed by the CPU 1204. The device management 80 can be stored in an FD, a CD-ROM, or a medium connected through a network of the NB 1207, as well as the HDD 1202, and can be added or updated as a file.

First, the configuration of the PC 1 will be described. An OS 730 is an operating system of the PC 1. An OS shell 720 is a shell of the OS 730. The OS shell 720 accepts display of the foregoing Devices and Printers 302 and a user operation. The printer driver 50 is loaded to the OS 730 for controlling the MFP 3. The device management 80 includes a control unit 700, a display unit 712, and a link execution unit 713. The control unit 700 has modules of an information collecting unit 701, a connection determining unit 702, and a destination generating unit 703. A device management control file 710 is loaded to the control unit 700, executes control corresponding to the MFP 3, and displays a UI. A destination parameter 711 is set by the control unit 700 and is referred to from the link execution unit 713 or the display unit 712. A browser 70 is a Web browser and a component, and is used for communication with the Web server connected through the link execution unit 713. A net port 740 is connected to the MFP 3.

The configuration of the MFP 3 will be described. A Web server 760 is a Web server. A WSD services 761 is a WSD service. A RUI service 762 is a service of a remote UI. A net port 750 is connected to the PC 1. A management information base (MIB) 763 is management information that is externally released by the MFP 3.

The block diagram illustrating an example of the software configuration of this system has been described. Next, a diagram illustrating an example of a data format of this system will be described.

Specific Example of Data Format

An example of the data format of this system will be described with reference to FIGS. 8A to 8C.

FIG. 8A illustrates an example of a device management control file. When the device management 80 is started, the device management control file in FIG. 8A is interpreted, and the control unit 700 controls the display unit 712 so as to display the device stage screen illustrated in FIG. 5A on the display of the PC.

In the device management control file 800, a manufacturer (MFG:) "ABC" and a model (MDL:) "Kmmn" corresponding to the device (MFP 3) are described in a <dm:manufacturer> element 801 and a <dm:model> element 802. The device management 80 searches for a device management control file for the device (MFP 3) among the device management control files stored in the Web server 9 or the CD-ROM 10 inserted into the PC 1 on the basis of the information described in the element 801 and the element 802.

Set in a <dm:function> element indicating respective buttons and functions in a <dm:functions> element in FIG. 8A.

The first <dm:function> element will be described. In a <dm:name xml:lang="en-US"> Printing Preferences</dm:name> element 807, a character string "Printing Preferences" that is displayed on the print setting button 91 in FIG. 3B is set. In a <dm:execute>printingPreferences</dm:execute> element 808, a keyword "PringingPreferences" representing a function (program) of displaying a printer driver UI is set. A <dm:function> element is pursued when the device management control file is read. As a result, upon press of the print setting button 91, the function described in the element 808 is executed, whereby the printer driver UI 61 is displayed.

In the second <dm:name xml:lang="en-US">Remote UI</dm:name> element 809, a character string "Remote UI" displayed on the RUI button 92 is set. In a <dm:execute>$RemoteUI</dm:execute> element 810, a keyword "$RemoteUI" representing execution of the remote UI function is set. Upon press of the remote UI button 92, the function described in the element 810 is executed. That is, the function corresponding to the keyword "$RemoteUI" is executed.

FIG. 8B illustrates an example of the types of connection ports.

The types of connection ports between the PC 1 and the MFP 3 include a transmission control protocol/Internet protocol (TCP/IP) port, a Web service discovery (WSD) port, a USB port, a parallel port, a communication (COM) port, and a file port.

FIG. 8C illustrates an example of a destination set to the destination parameter 711. The destination has the following format. The meaning of the data will be described below.

http://{IP address}:{port number}/(850)

The following is a specific example in which the IP address of a device and the port number of a Web server are combined and set to the destination parameter 711.

http://192.168.1.3:80/(851)

Furthermore, in addition to the foregoing destination 851, which is a top address of the RUI, a predetermined path may be added. Here, 80 is set as the port number. If the port of the RUI is set to another port in the MFP or PC, another number may be used. A port number recognized by the device management 80 in advance or a port number determined through communication may be dynamically inserted.

A description has been given above of an example of the data format of this system. Next, a data flow of this system will be described.

[Data Flow During Execution of RUI]

The data flow of this system will be described with reference to FIG. 9. Here, a data flow during display of the RUI is mainly described. The program corresponding to the flow in FIG. 9 is stored in the HDD 1202, is read to the RAM 1201, and is executed by the CPU 1204.

When the OS of the PC 1 executes a process of device installation 900, installation setting is set to an OS system I/F 904. For example, the printer driver corresponding to the MFP 3 is installed, and setting of a network address as a print port and a protocol is performed on the MFP 3. The setting information is obtained and held by the system I/F 904. Also, when the OS of the PC 1 performs the process of the device installation 900, the OS transmits a request to the Web server 760 of the MFP 3 in parallel. The Web server 760 of the MFP 3 receives a description of the MFP 3 from the WSD services 761 and transmits it to the OS system I/F 904. The description is data describing information about the device and includes the URL of the device (e.g., network address). Also, when processing the device installation 900, the OS of the PC 1 may request MIB information of the MFP 3, receive the port number corresponding to the remote UI and the type of connectable port, and transmit them to the OS system I/F 904. The timing to collect those pieces of information may be at the change of the setting of the driver, as well as at the installation of the driver. For example, the timing at which an instruction to display the printer driver UI is provided from the Printing Preference in FIGS. 3A and 3B and at which setting of the IP address and the type of connection port is changed may also be used.

When an instruction to display the device stage screen is provided, the device management 80 of the PC 1 displays the RUI button 92 on which the $RemoteUI keyword is mapped, the keyword being described in the device management control file 710. When a press of the RUI button 92 by a user is accepted, the $RemoteUI command mapped on the RUI button is issued in the device management 80, and $RemoteUI execution (process) 905 starts.

In the $RemoteUI execution 905, the type of the current device is transmitted to the information collecting unit (process) 701.

The information collecting unit 701 collects a connection method corresponding to the type of the device, address, port number, and URL from the OS system I/F 904 and supplies them to the destination generating unit 703. This process will be described below with reference to FIG. 10A.

The destination generating unit 703 generates a destination by combining the connection method, address, port number, URL, prefix, and suffix. This process will be described below with reference to FIG. 10C.

The destination generated by the destination generating unit 703 is supplied to the destination parameter 711. The link execution unit 713 of the PC 1 issues a request to the destination of the destination parameter 711, and the Web server 760 of the MFP 3 receives the request. The Web server 760 of the MFP 3 transmits the request to the RUI service 762, and supplies a response thereto to the display unit 712 that displays the RUI of the PC 1. These processes will be described below with reference to FIG. 11A and FIG. 11B.

A description has been given above of the data flow in this system. Next, flowcharts of the device management 80 will be described.

[Flowcharts of Information Collecting Unit, Connection Determining Unit, and Destination Generating Unit]

Figure 10A:
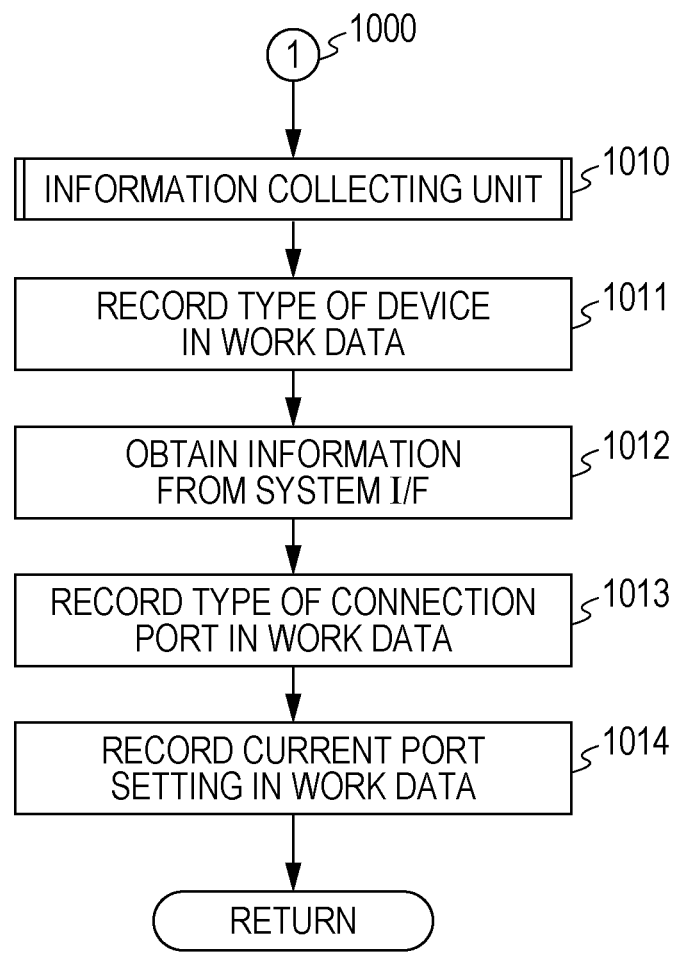
FIG. 10A is a flowchart illustrating an example of a process performed by an information collecting unit 701 in FIG. 7.
Figure 10B:
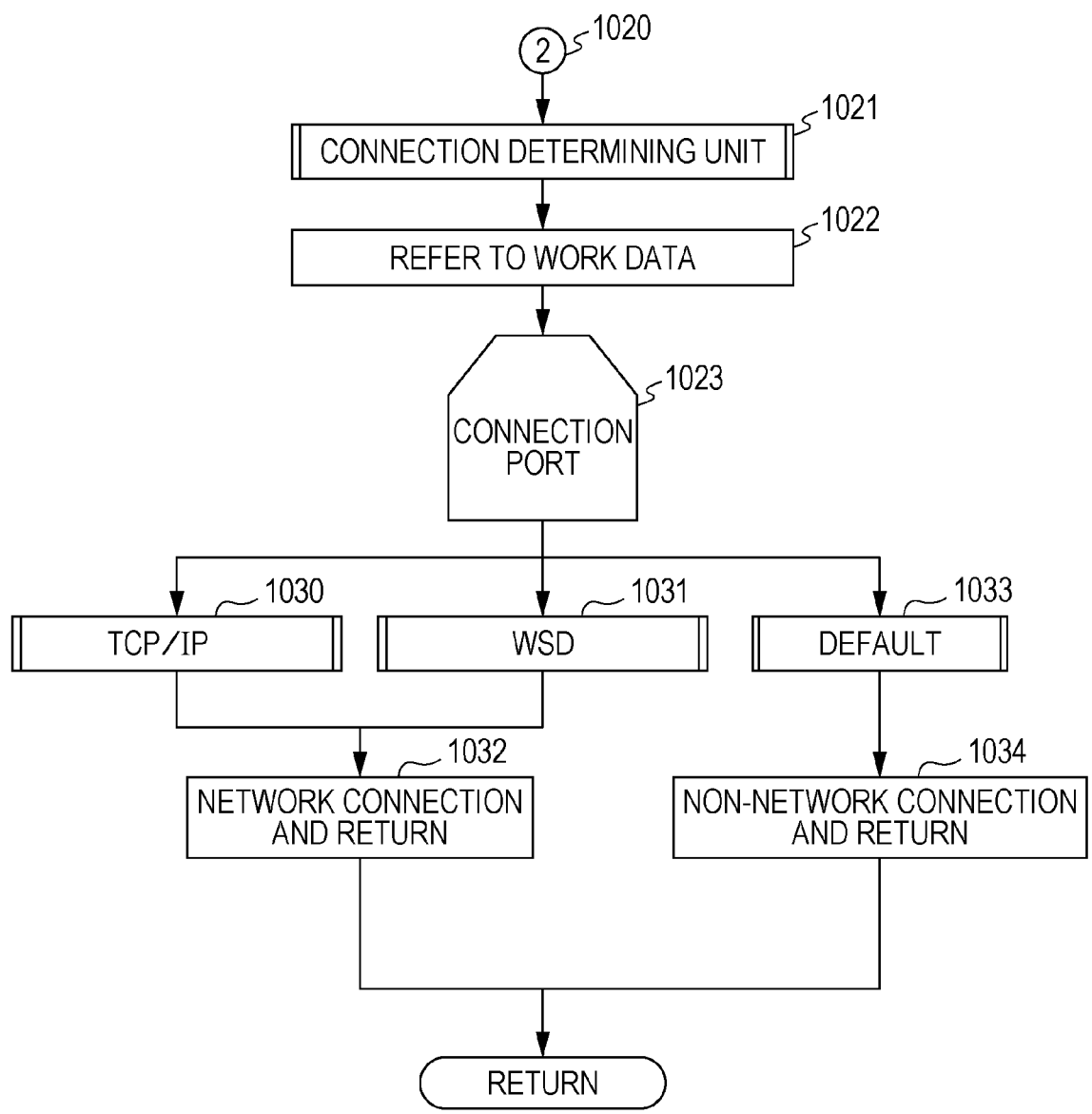
FIG. 10B is a flowchart illustrating an example of a process performed by a connection determining unit 702 in FIG. 7.
Figure 10C:
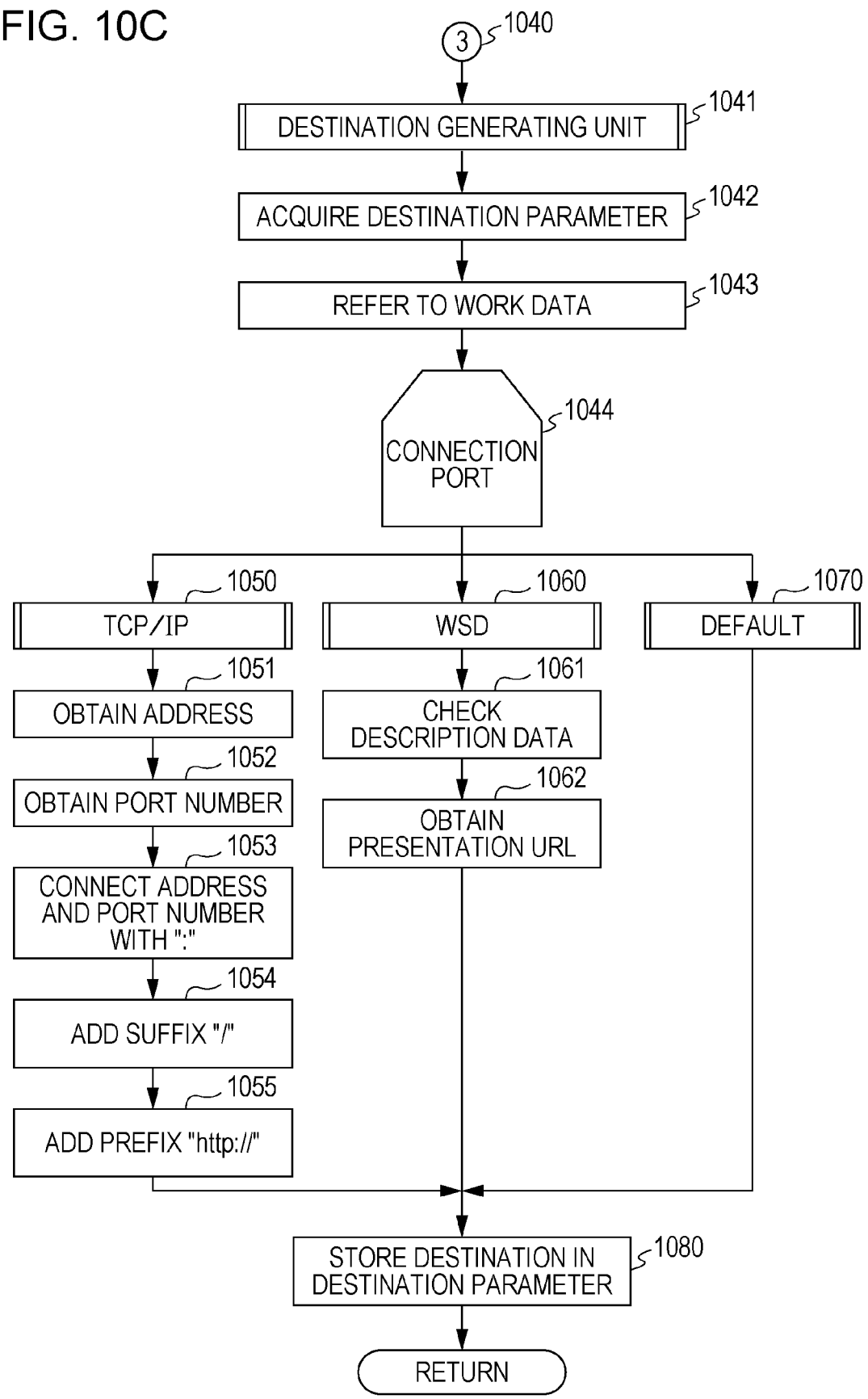
FIG. 10C is a flowchart illustrating an example of a process performed by a destination generating unit 703 in FIG. 7.

FIG. 10A, FIG. 10B, and FIG. 10C are flowcharts of the information collecting unit, the connection determining unit, and the destination generating unit of the device management 80. The program corresponding to the flowcharts in FIGS. 10A to 10C is stored in the HDD 1202, is read to the RAM 1201, and is executed by the CPU 1204.

First, a flow 1 (FIG. 10A) for a process of collecting connection information of the PC 1 and the MFP 3 will be described.

The flow of the information collecting unit 701 of the device management 80 starts. In the flow described below, the process starts at the timing at which the process is called.

A description has already been given about that a user selects a device icon from among a plurality of devices. Thus, at the start of the device stage where one device is substantially selected, the type of device (MPF 3) is specified. Then, in step 1011, the information collecting unit 701 records the type of device that is specified and that is currently selected (=MFP 3) in work data 714. Subsequently, in step 1012, the information collecting unit 701 obtains information about the type of connection port of the selected MFP 3 from the system I/F (information indicating a corresponding communication protocol). The obtained information is the information that is collected by the system I/F in advance or information that is collected by the system I/F at every inquiry, as described above with reference to FIG. 9.

Subsequently, in step 1013, the information collecting unit 701 records the type of connection port in the work data 714. In step 1014, the information collecting unit 701 records the current port setting in the work data 714. An example of the current port setting includes a network address as a print destination that is set to the printer driver, a printing protocol, and a network address that is currently set on a printer side.

Here, the information recorded in the work data includes the network address that is set to the printer driver, the current network address of the MFP 3, and the communication protocol supported by the MFP (the type of connection port), as described above. Those pieces of information are used to determine a connection port in 1044 in FIG. 10C and are appropriately used to generate a destination in FIG. 10C.

Next, a flow 2 for a process of determining whether the PC 1 is connected to the MFP 3 through a network will be described.

In step 1021, the flow of the connection determining unit 702 of the device management 80 starts in accordance with a call of the connection determining unit 702. In step 1022, the connection determining unit 702 refers to the work data 714. From step 1023, the connection determining unit 702 determines the type of connection port of the MFP 3. If the connection determining unit 702 determines in step 1030 that the type of connection port is a TCP/IP port, the process proceeds to step 1032. If the connection determining unit 702 determines in step 1031 that the type of connection port is a WSD port, the process proceeds to step 1032. In step 1032, the connection determining unit 702 determines that the connection is made through a network, and the process returns. If the connection determining unit 702 determines default in step 1033, the process proceeds to step 1034. In step 1034, the connection determining unit 702 determines that the connection is not made through a network, and the process returns.

Furthermore, a description will be given of a flow 3 for a process of generating a destination in accordance with the type of connection between the PC 1 and the MFP 3. In this process, an appropriate destination parameter is generated in accordance with the selected type of connection port of the MFP 3.

The flow of the destination generating unit 703 starts from step 1041. In step 1042, the destination generating unit 703 acquires the destination parameter 711. In step 1043, the destination generating unit 703 refers to the work data 714. From step 1044, the destination generating unit 703 determines the type of connection port. In step 1050, if the destination generating unit 703 determines that the type of connection port is TCP/IP, the process proceeds to step 1051. In step 1051, the destination generating unit 703 obtains the address of the MFP 3. The address may be the address that is set in the printer driver corresponding to the MFP 3, or may be an address obtained from the MFP 3 through various types of communication using a USB or TCP/IP. In step 1052, the destination generating unit 703 obtains the port number of the MPF 3. The port number may be obtained in advance from the MFP 3, or may be collected in another method. In step 1053, the destination generating unit 703 connects the address and the port number with ':'. In step 1054, the destination generating unit 703 adds a suffix '/'.

In step 1055, the destination generating unit 703 adds a prefix "http://" so as to generate a destination.

In step 1060, if the destination generating unit 703 determines that the type of connection port is WSD, the process proceeds to step 1061.

In step 1061, the destination generating unit 703 obtains description data of the MFP 3. In step 1062, the destination generating unit 703 obtains a presentation URL to generate a destination. In step 1070, if the destination generating unit 703 determines that the type of connection port is default (e.g., a network protocol other than TCP/IP or WSD), the process proceeds to step 1080. In step 1080, the destination generating unit 703 stores the destination in the destination parameter 711.

[Flowcharts of Displaying RUI Button and Executing RUI]

Figure 11A:
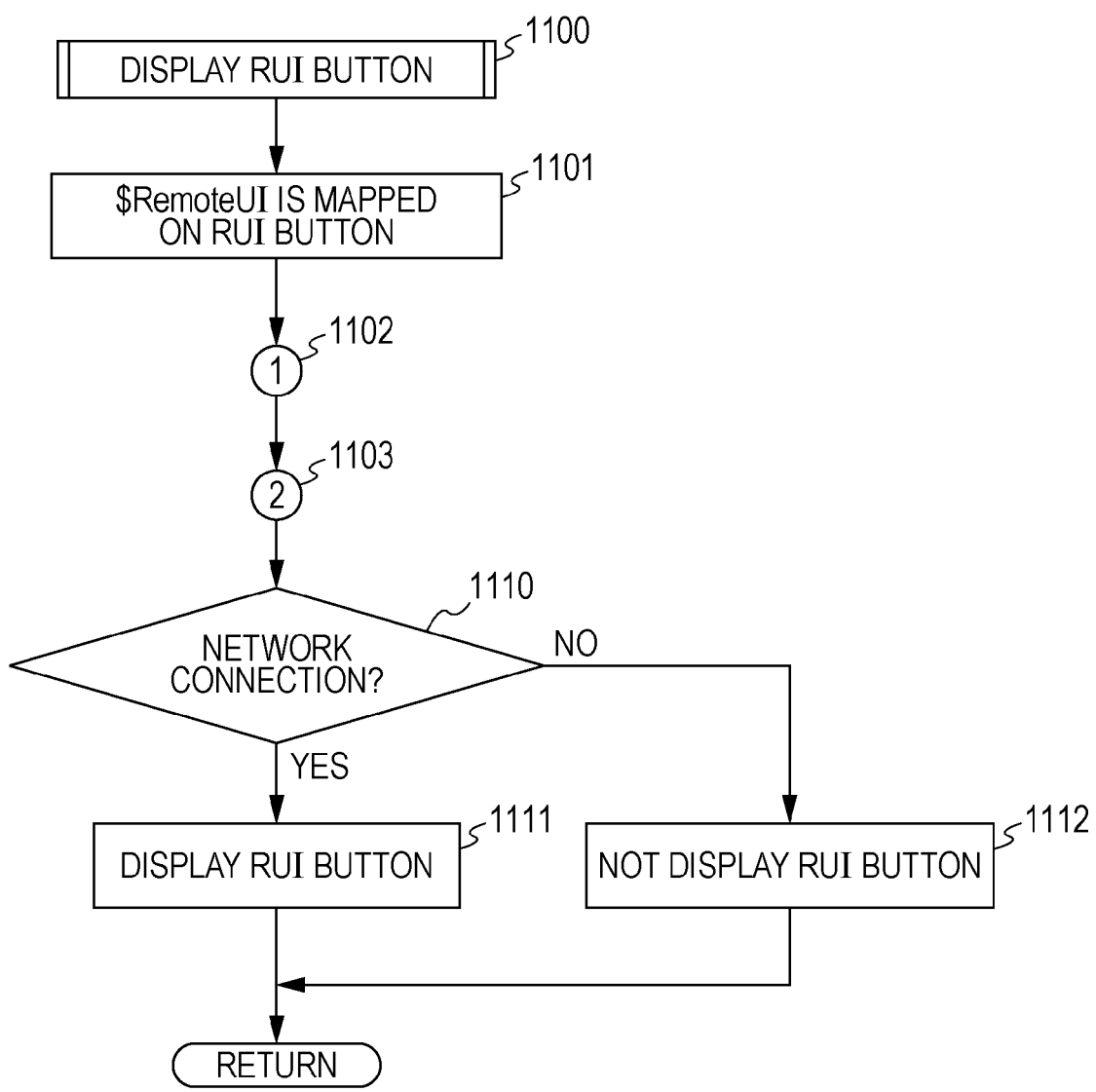
FIG. 11A is a flowchart illustrating an example of a process of displaying a RUI button in a device management 80.
Figure 11B:
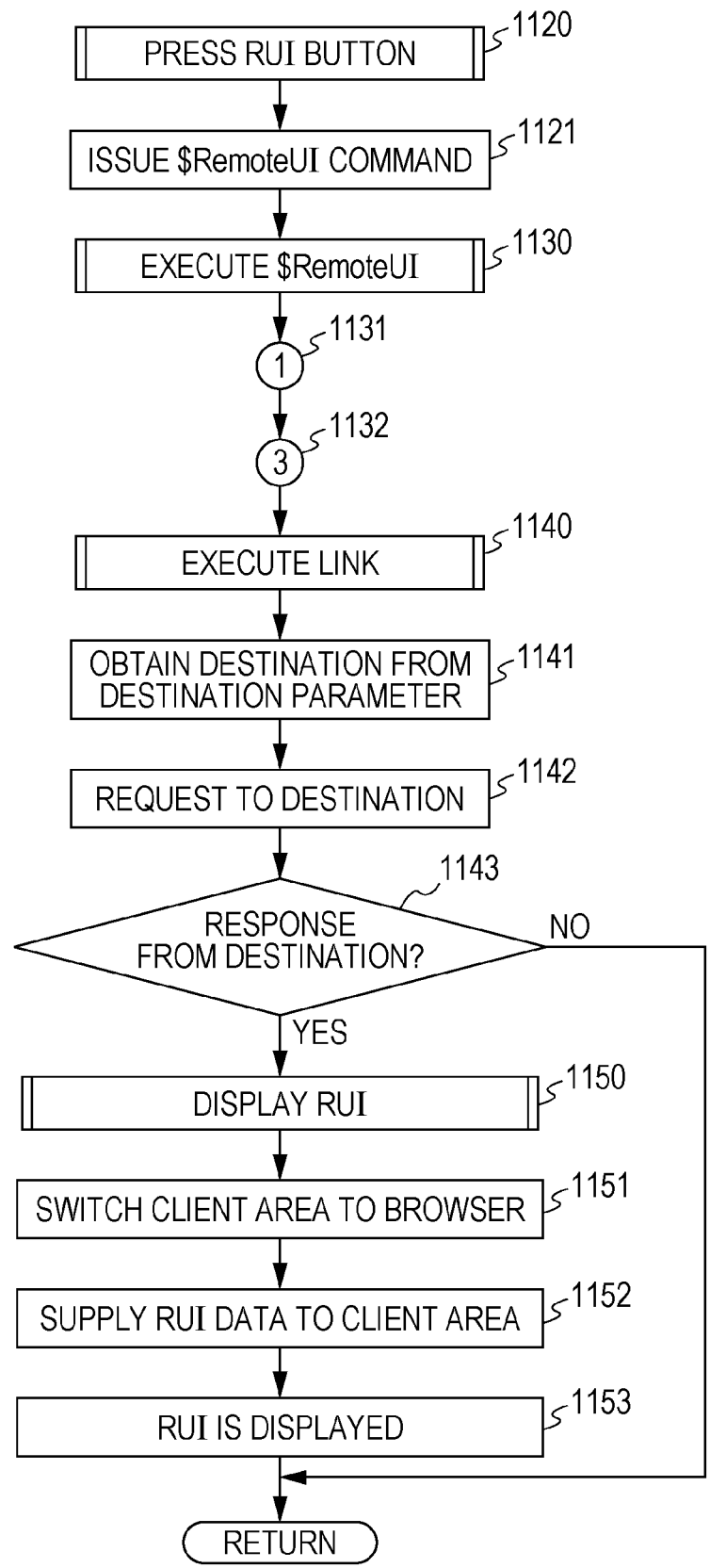
FIG. 11B is a flowchart illustrating an example of a process of executing a RUI in the device management 80.

FIG. 11A and FIG. 11B are flowcharts of displaying the RUI button and executing the RUI of the device management 80. The program corresponding to the flow illustrated in FIGS. 11A and 11B is stored in the HDD 1202, is read to the RAM 1201, and is executed by the CPU 1204.

First, a description will be given of a flow of display/non-display of the RUI button (FIG. 11A). For example, when an instruction to display a device stage screen is provided, the process illustrated in FIG. 11A is executed by the device management 80.

In step 1101, the file in FIG. 8A is interpreted, and the display unit 712 of the device management 80 maps $RemoteUI to the RUI button, as defined in the element 810. In step 1102, the display unit 712 calls the flow number 1 (FIG. 10A). In step 1103, the display unit 712 calls the flow number 2 (FIG. 10B).

In step 1110, if the display unit 712 determines that the return value in FIG. 10B is network connection, the process proceeds to step 1111. If the display unit 712 determines that the return value is not network connection, the process proceeds to step 1112. In step 1111, the display unit 712 displays the RUI button. In step 1112, the display unit 712 does not display the RUI button.

A description will be given of a case where the RUI button is pressed with reference to FIG. 11B. When detecting a press of the RUI button (e.g., 92 in FIG. 5A) by a user, the display unit 712 of the device management 80 starts the process (1120).

In step 1121, the display unit 712 issues a $RemoteUI command to the control unit 700. In step 1130, the control unit 700 executes the $RemoteUI command.

In step 1131, the control unit 700 calls the flow number 1 (FIG. 10A).

In step 1132, the control unit 700 calls the flow number 3 (FIG. 10C).

In step 1140, the link execution unit 713 detects an instruction to execute a link from the control unit 700. In step 1141, the link execution unit 713 obtains the destination corresponding to the MFP 3 from the destination parameter 711.

In step 1142, the link execution unit 713 requests the destination to reference (connection). In the case of the MFP 3, connection to the device of the IP address and the port number generated in FIG. 8C is performed.

In step 1143, the link execution unit 713 checks a response from the destination. If a response has been received, the link execution unit 713 notifies the control unit 700 of that fact to return the control, and the process proceeds to step 1150.

If a response has not been received, the link execution unit 713 returns the control to the control unit 700 and ends the process.

In step 1150, the display unit 712 receives an instruction to display the RUI from the control unit 700. In step 1151, the display unit 712 switches the client area to a browser component. In step 1152, the display unit 712 supplies RUI data into the client area.

In step 1153, the display unit 712 displays the RUI and returns the control to the control unit 700.

The flowcharts of the device management 80 have been described above. Now, a description will be given of the reason why the flow number 1 is called a plurality of times in a flow. When the printer driver UI 61 is opened from the device management screen 90 as illustrated in FIG. 3B, it is possible that the setting of the connection port is changed after the device stage screen is displayed. In order to handle the change of the setting of the connection port, the flow number 1 is called a plurality of times to update connection information. If the device management screen 90 has a configuration not affected by change of the setting of the connection port, the call of the flow number 1 may be omitted. Next, another example of the flowchart of the device management 80 will be described.

Another Example of Flowchart

Figure 12:
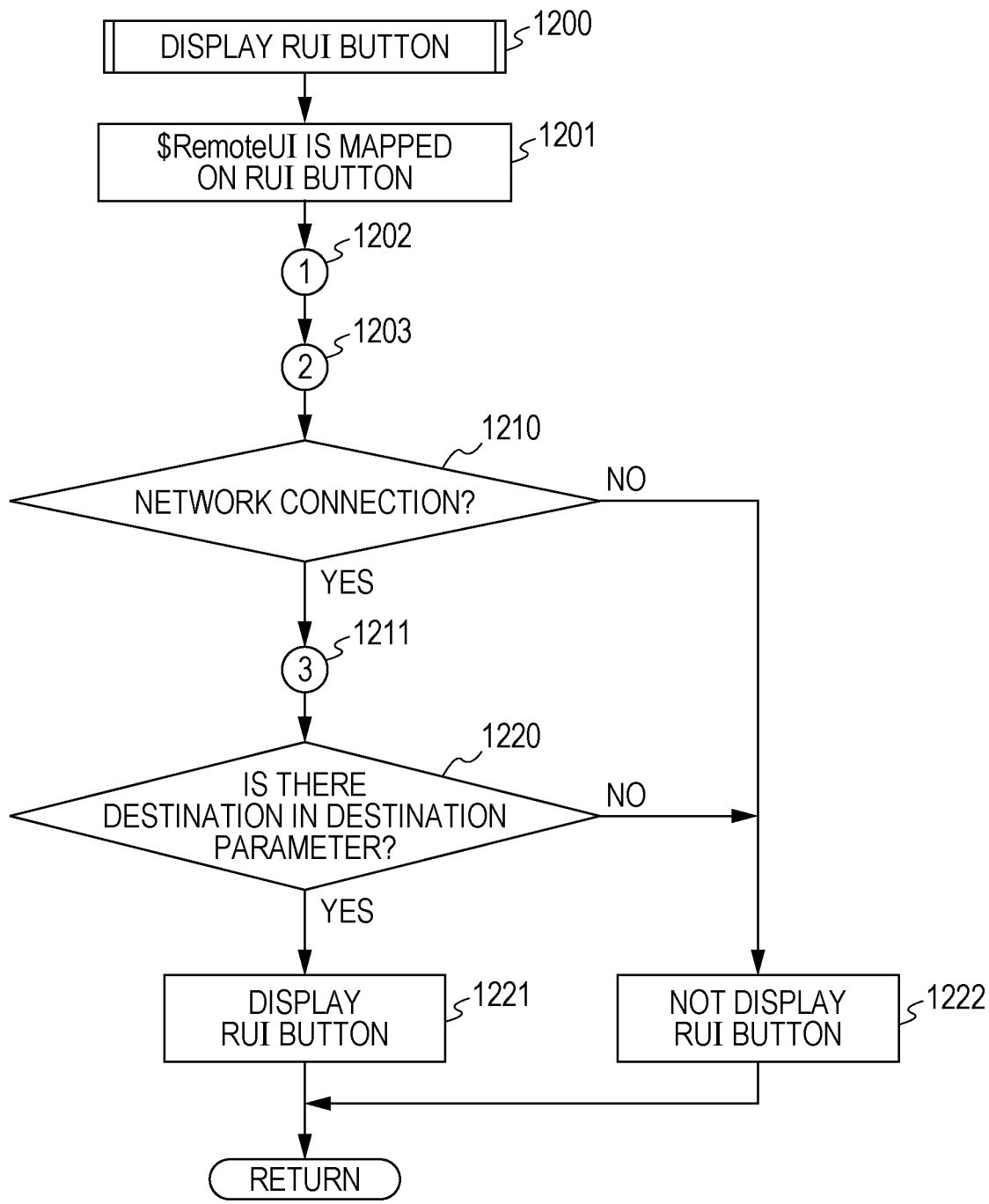
FIG. 12 is a diagram illustrating another embodiment of the device management 80.

FIG. 12 illustrates another embodiment of the flowchart of the device management 80. Another embodiment of the flow of display/non-display of the RUI button illustrated in FIG. 11A will be described. The display unit 712 displays the RUI button when there is a destination.

The process starts in accordance with an instruction to display a device stage screen. Hereinafter, a description will be given mainly of the part difference from FIG. 11A. In step 1201, the display unit 712 of the device management 80 maps $RemoteUI to the RUI button. In step 1202, the display unit 712 calls the flow number 1 (FIG. 10A). In step 1203, the display unit 712 calls the flow number 2 (FIG. 10B). In step 1210, if it is determined that network connection is made as a result of the call of FIG. 10B, the display unit 712 proceeds to step 1211. If it is determined that network connection is not made, the display unit 712 proceeds to step 1222.

In step 1211, the display unit 712 calls the flow number 3 (FIG. 10C).

In step 1220, if there is a destination in the destination parameter 711, the display unit 712 proceeds to step 1221. If there if not a destination in the destination parameter 711, the display unit 712 proceeds to step 1222. In step 1221, the display unit 712 displays the RUI button. In step 1222, the display unit 712 does not display the RUI button. That is, by calling the process in FIG. 10C in step 1211, the type of connection port used in the network connection is determined, a destination is dynamically generated, and the destination is set as a link destination of the RUI.

Another embodiment of the flowchart in FIG. 10A of the device management 80 has been described.

The processes of the software have been described above. Now, the effects of the system according to this embodiment will be described.

The remote UI function has the following three problems about setting, recognition, and configuration, which are solved. The following are about setting. Inputting an address to the RUI, which is difficult for a user, is simplified. An operation of constructing an address and inputting it to a web browser, which is difficult for a user, is simplified. A setting item to be referred to, which varies depending on a connection method, is automatically determined through the processes illustrated in FIGS. 10B and 10C.

The following are about recognition. The remote UI function, which is not recognized by a user, can be easily called by the user. A problem that a user himself/herself needs to perform execution, not by a function displayed on the MFP 3 or PC 1, is solved. It is difficult to determine the software to be used to display a remote UI, but it can be easily called in a device stage. It is necessary to start other software, that is, a Web browser of the PC 1, but it can be easily started.

In order to solve the problem, the device management 80 combines connection information in accordance with a connection method, thereby generating a destination. The device management 80 switches between display/non-display in accordance with a connection method or a result of generating a destination. Also, the device management 80 seamlessly displays a remote UI in the RUI on the device management. Also, the following effects of operability and energy saving can be obtained. Setting of the MFP 3 can be made on a large screen of the PC 1. The number of user operations performed to display a remote UI can be reduced.

The effects of this embodiment have been described above.

The MPF 3 has been described as an example of a peripheral device, but other image forming devices can be assumed. Also, as an example of a link related to the MFP 3, the keyword of the RUI (see the element 810 in FIG. 8A) corresponding to the RUI button 92 in FIG. 5A and the URL that is generated on the basis of the keyword are disclosed. Also, a description has been given about that the PC 1, which is an example of an information processing device, displays a link display corresponding to the keyword of the RUI on the device screen. Also, a description has been given of the information collecting unit 701, which is an example of a function of obtaining device information of the MFP 3. An example of the link display includes the RUI button 92 in FIG. 3A and display of the remote UI. Clicking the link display causes access to a corresponding link destination.

Furthermore, the destination generating unit 703 has been described as an example of a link forming function of forming a link corresponding to setting information obtained by the information collecting unit 701 from the RAM 17 or the RAM 1201.

The browser 70 has been described as an example of an access function of accessing the Web server 760, which is an example of a device management program for managing the MFP 3 corresponding to a link when it is determined that an instruction of the link formed by the destination generating unit 703 has been provided on the device screen. The device stage has been described as an example of the device screen.

Furthermore, the PC 1 includes the display unit 712, which is an example of a display control function of performing control so that a link is not displayed on the device screen when the device information of the MFP 3 indicates that the MFP 3 is incompatible with a network.

The destination generating unit 703 generates a destination, which is an example of a link, by combining a port number in the MFP 3 and a network address obtained by the information collecting unit 701.

The destination generating unit 703 generates a destination by using the description data of the MFP 3.

The information collecting unit 701 and the OS system may obtain updated device information when an instruction to display a device screen is provided or when the setting of the MFP 3 is changed.

The CPU 1204 constituted by the hardware circuit illustrated in FIG. 2A may be a single CPU or a plurality of CPUs. This is the same for the CPU 15. The processes according to this embodiment are stored in a memory and are executed by at least one CPU, thereby being associated with a special device.

There is an advantage that operability of device remote management increases.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/068080, filed Oct. 20, 2009, which is hereby incorporated by reference herein in its entirety.

What is claimed is:

1. An information processing device comprising:
a displaying unit configured to display a device management screen for one peripheral device, wherein the device management screen is launched by specifying one of a plurality of peripheral devices from a peripheral device list, includes a first instruction part for instructing to launch a first setting screen for managing setting information stored in the information processing device, and includes a second instruction part for instructing to launch a second setting screen for managing setting information stored in the peripheral device;
an obtaining unit configured to obtain device information of the peripheral device;
a determination unit configured to determine a connection type of the peripheral device;
a control unit configured to control the second instruction on the device management screen based on the connection type determined by the determination unit;
a first detecting unit configured to detect an instruction via the first instruction part on the device management screen;
a first launching unit configured to launch the first setting screen when the first detecting unit detects the instruction via the first instruction part on the device management screen;
a second detecting unit configured to detect an instruction via the second instruction part on the device management screen;
a generating unit configured to generate destination information based on the connection type determined by the determination unit and the device information obtained by the obtaining unit; and
an accessing unit configured to access a remote user interface service provided by a WEB server embedded in the peripheral device based on the destination information generated by the generating unit and to launch the second setting screen for managing the setting information in the peripheral device, when the second detecting unit detects the instruction via the second instruction part on the device management screen.

2. The information processing device according to claim 1, wherein the control unit performs control of the device management screen such that the second instruction part is not displayed on the device screen when the determination unit determines that the connection type of the peripheral device is not a network type.

3. The information processing device according to claim 1, wherein the generating unit generates the destination information when the second detecting unit detects the instruction via the second instruction part on the device management screen.

4. The information processing device according to claim 1, wherein the first setting screen is a user interface of a printer driver.

5. The information processing device according to claim 1, wherein the generating unit generates the destination information by combining a port number and address information included in the device information obtained by the obtaining unit.

6. The information processing device according to claim 1, wherein the generating unit generates the destination information by using description data included in the device information obtained by the obtaining unit.

7. A method for controlling an information processing device which displays a device management screen for one peripheral device, the device management screen being launched by specifying one of a plurality of peripheral devices from a peripheral device list, including a first instruction part for instructing to launch a first setting screen for managing setting information stored in the information processing device, and including a second instruction part for instructing to launch a second setting screen for managing setting information stored in the peripheral device, the method comprising:

an obtaining step of obtaining device information of the peripheral device;

a determination step configured to determine a connection type of the peripheral device;

a control step configured to control the second instruction on the device management screen based on the connection type determined;

a first detecting step configured to detect an instruction via the first instruction part on the device management screen;

a first launching step configured to launch the first setting screen when the first detecting step detects the instruction via the first instruction part on the device management screen;

a second detecting step configured to detect an instruction via the second instruction part on the device management screen;

a generating step of generating destination information based on the connection type determined by the determination unit and the device information obtained by the obtaining step; and an accessing step of accessing to a remote user interface service provided by a WEB server embedded in the peripheral device based on the destination information generated in the generating step and of launching the second setting screen for managing the setting information in the peripheral device, when the instruction is detected via the second instruction part on the device management screen in the second detecting step.

8. The method according to claim 7, wherein the control step of controlling the device management screen such that the second instruction part is not displayed on the device screen when the connection type of the peripheral device is not determined as a network type in the determination step.

9. The method according to claim 7, wherein the destination information is generated in the generating step when the instruction is detected via the second instruction part on the device management screen in the second detecting step.

10. The method according to claim 7, wherein the first setting screen is a user interface of a printer driver.

11. The method according to claim 7, wherein the destination information is generated in the generating step by combining a port number and address information included in the device information obtained in the obtaining step.

12. The method according to claim 7, wherein the destination information is generated in the generating step by using description data included in the device information obtained in the obtaining step.

13. A non-transitory computer readable storage medium storing a control program that causes a hardware circuit to execute a method for controlling an information processing device which displays a device management screen for one peripheral device, the device management screen being launched by specifying one of a plurality of peripheral devices from a peripheral device list, including a first instruction part for instructing to launch first setting screen for managing setting information stored in the information processing device and including a second instruction part for instructing to launch a second setting screen for managing setting information stored in the peripheral device, the method comprising:

an obtaining step of obtaining device information of the peripheral device;

a determination step configured to determine a connection type of the peripheral device;

a control step configured to control the second instruction on the device management screen based on the connection type determined;

a first detecting step configured to detect an instruction via the first instruction part on the device management screen;

a first launching step configured to launch the first setting screen when the first detecting step detects the instruction via the first instruction part on the device management screen;

a second detecting step configured to detect an instruction via the second instruction part on the device management screen;

a generating step of generating destination information based on the connection type determined by the determination unit and the device information obtained in the obtaining step; and an accessing step of accessing to a remote user interface service provided by a WEB server embedded in the peripheral device based on the destination information generated in the generating step and of launching the second setting screen for managing the setting information in the peripheral device, when the instruction is detected via the second instruction part on the device management screen in the second detecting step.

* * * * *